Nov. 13, 1928.
J. G. CARROLL
1,691,046
VEHICLE CONTROL
Filed April 19, 1924        6 Sheets-Sheet 4
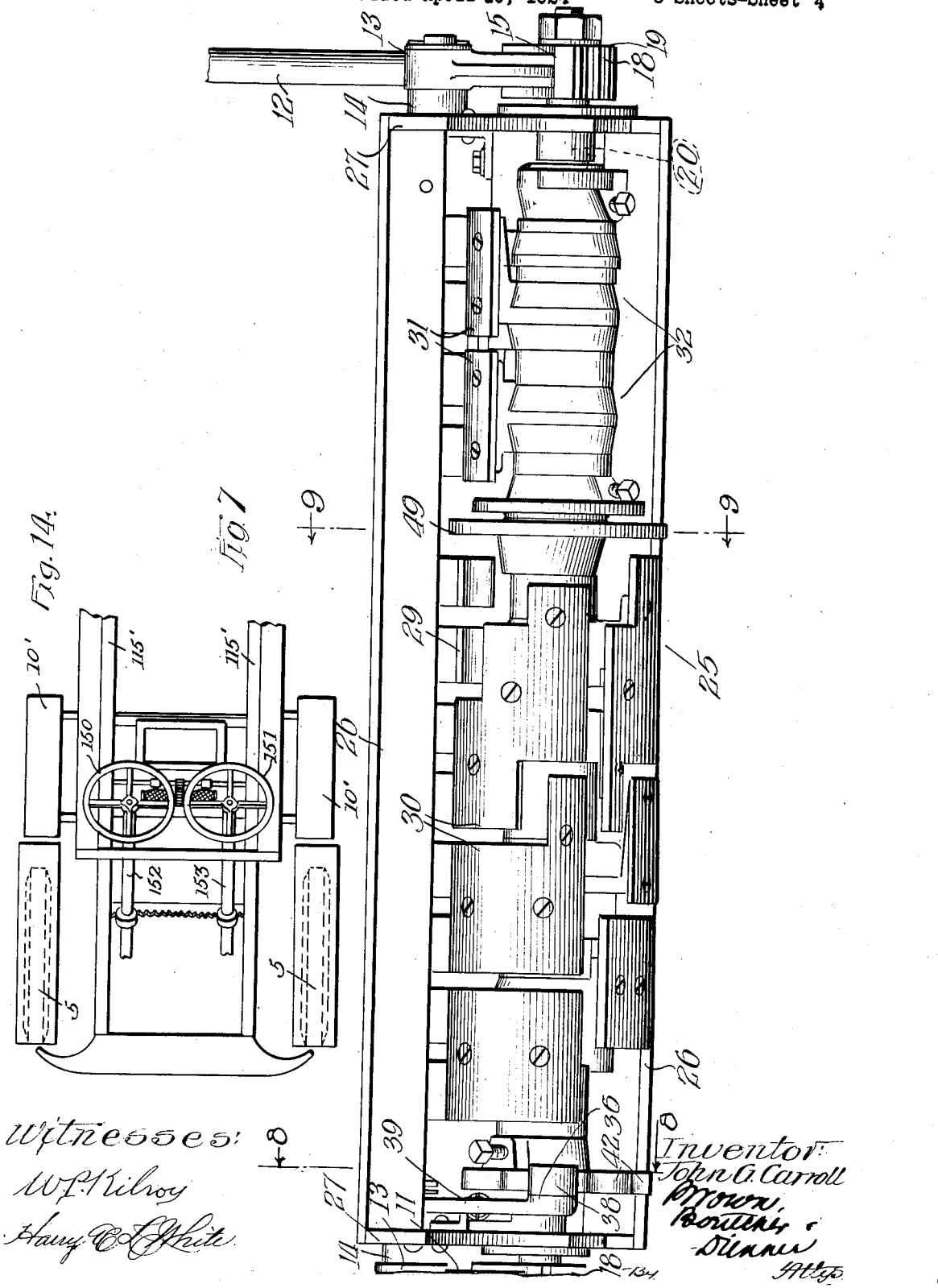

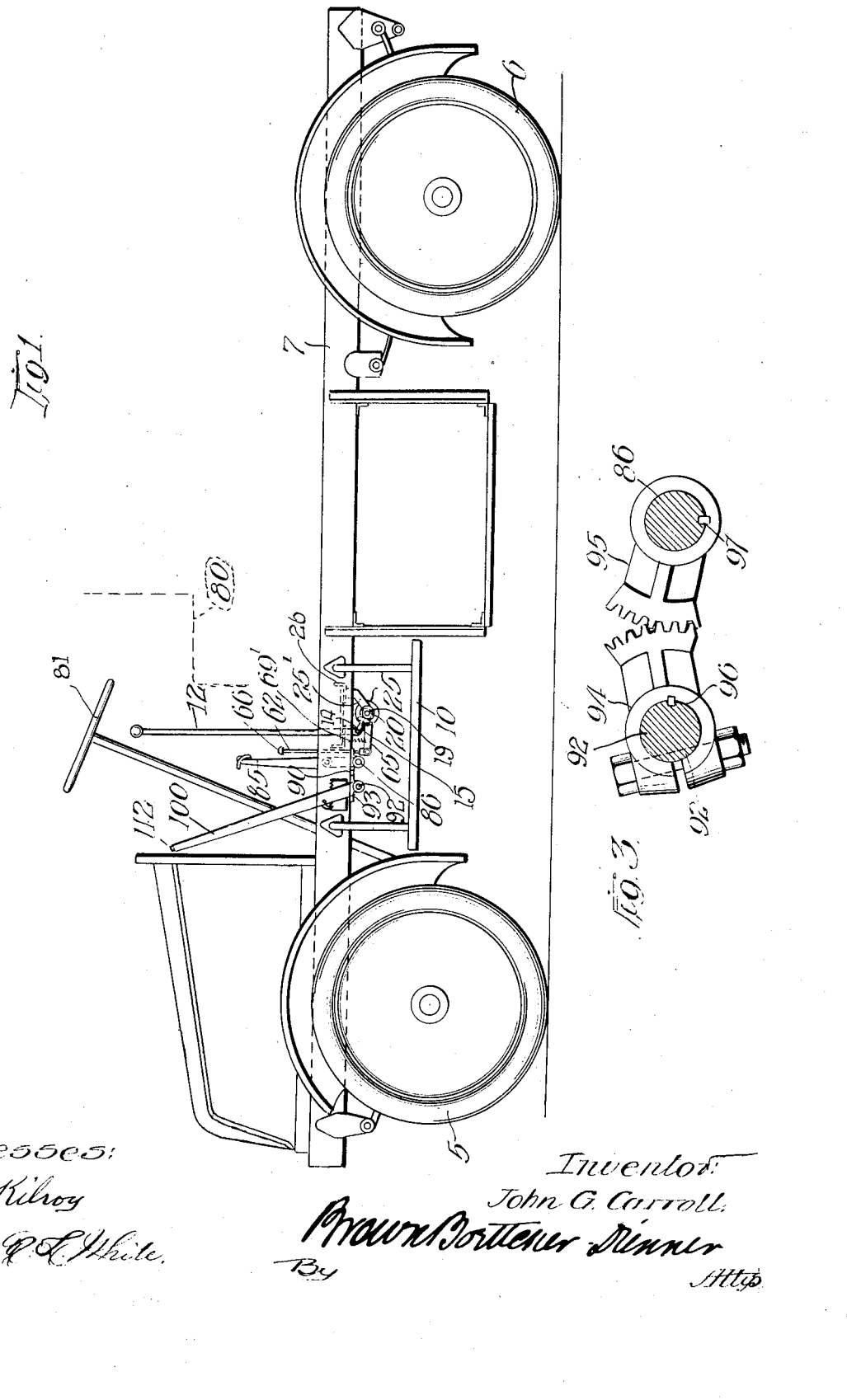

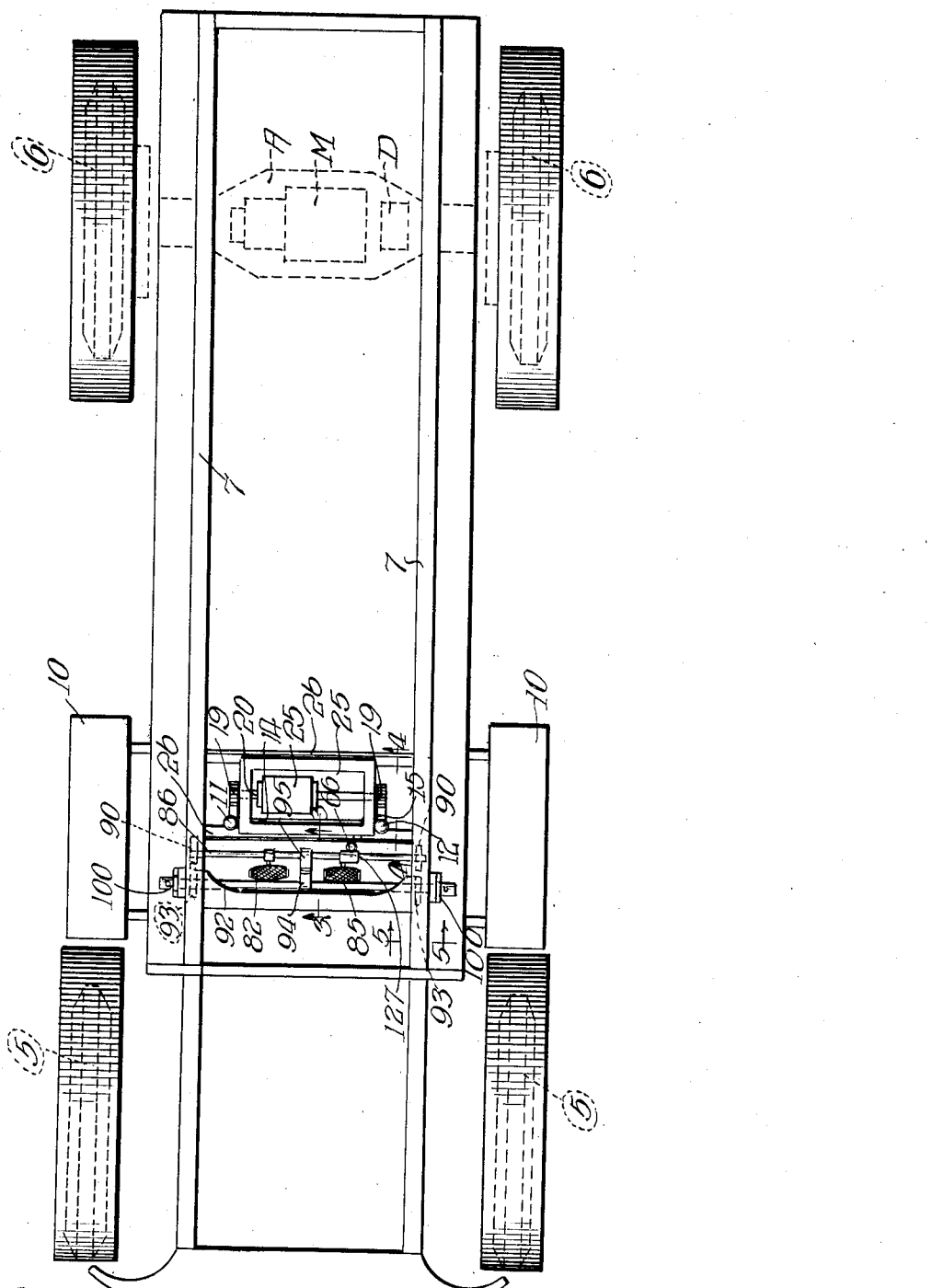

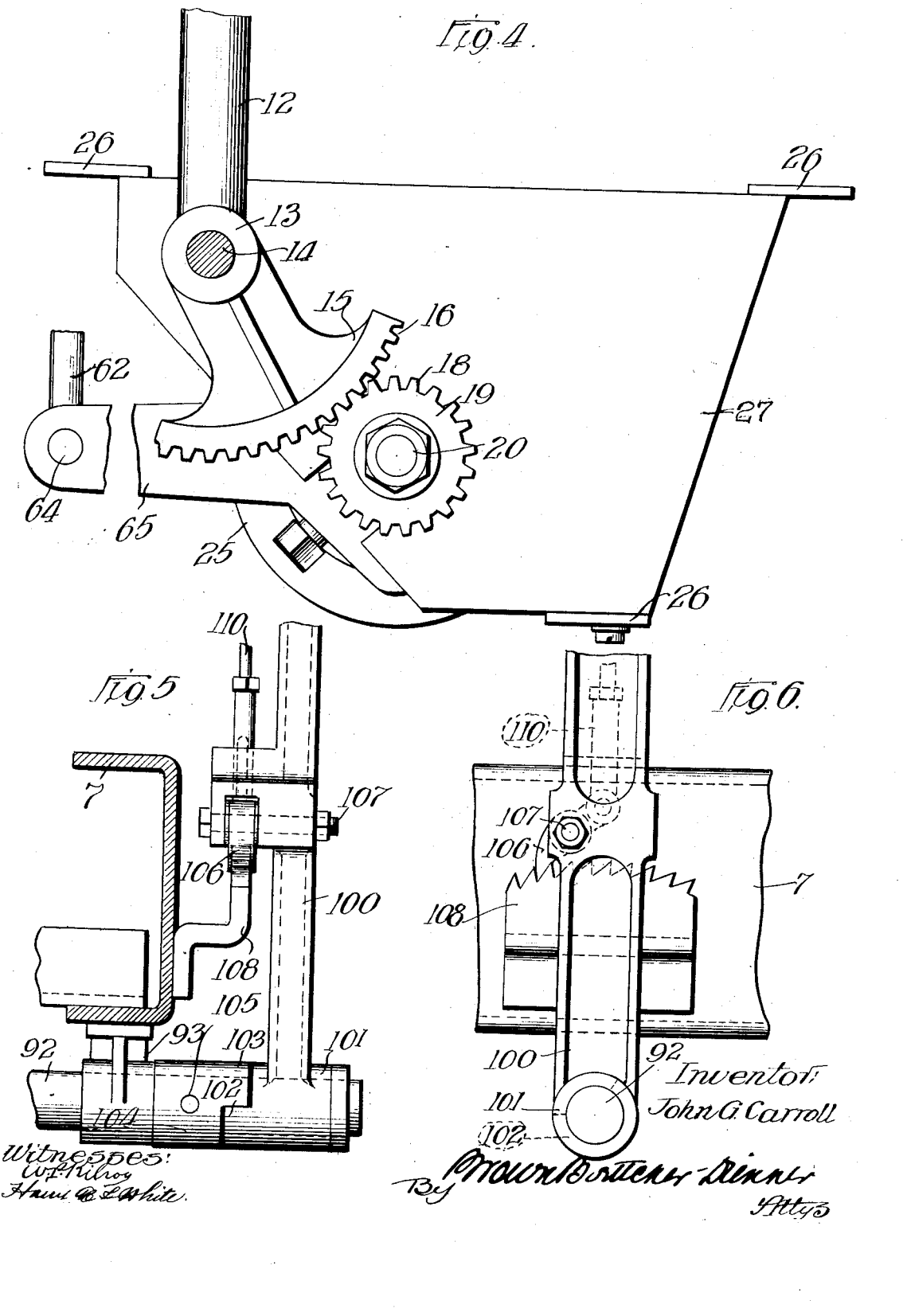

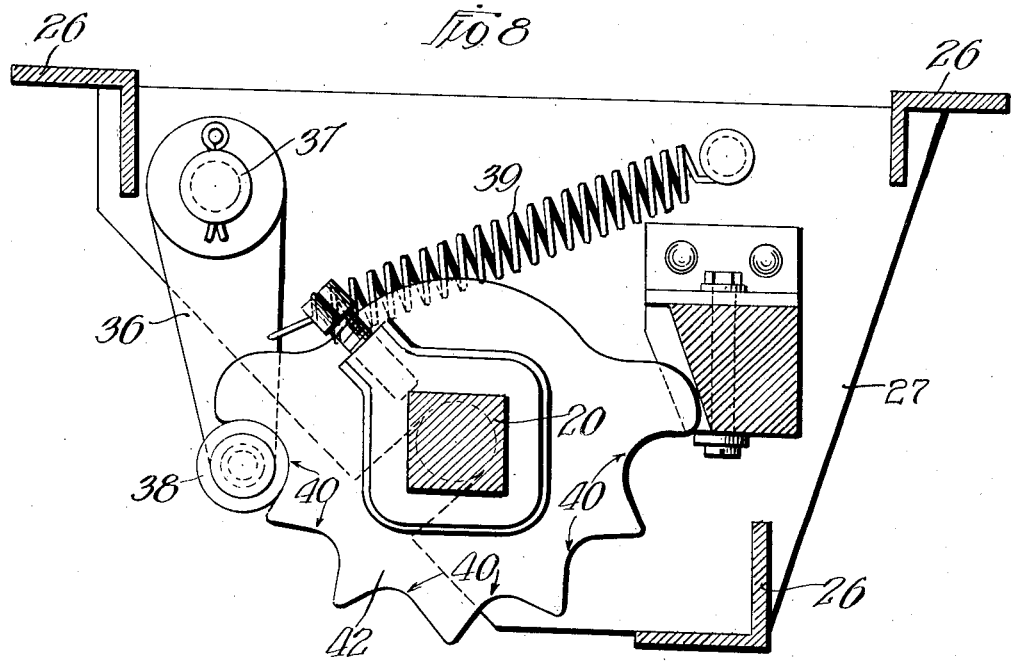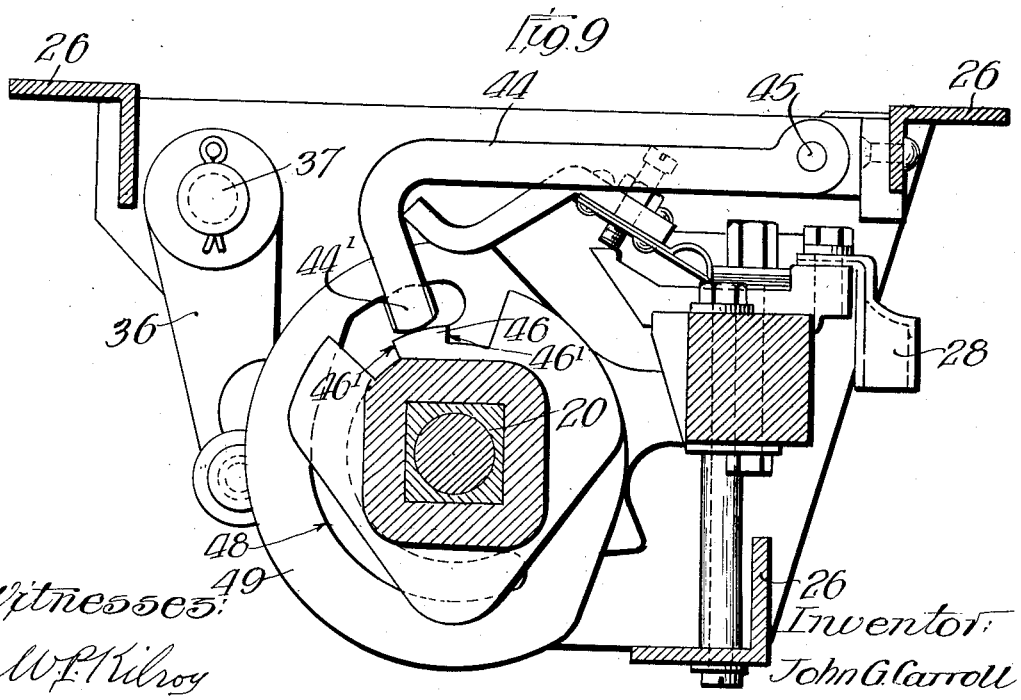

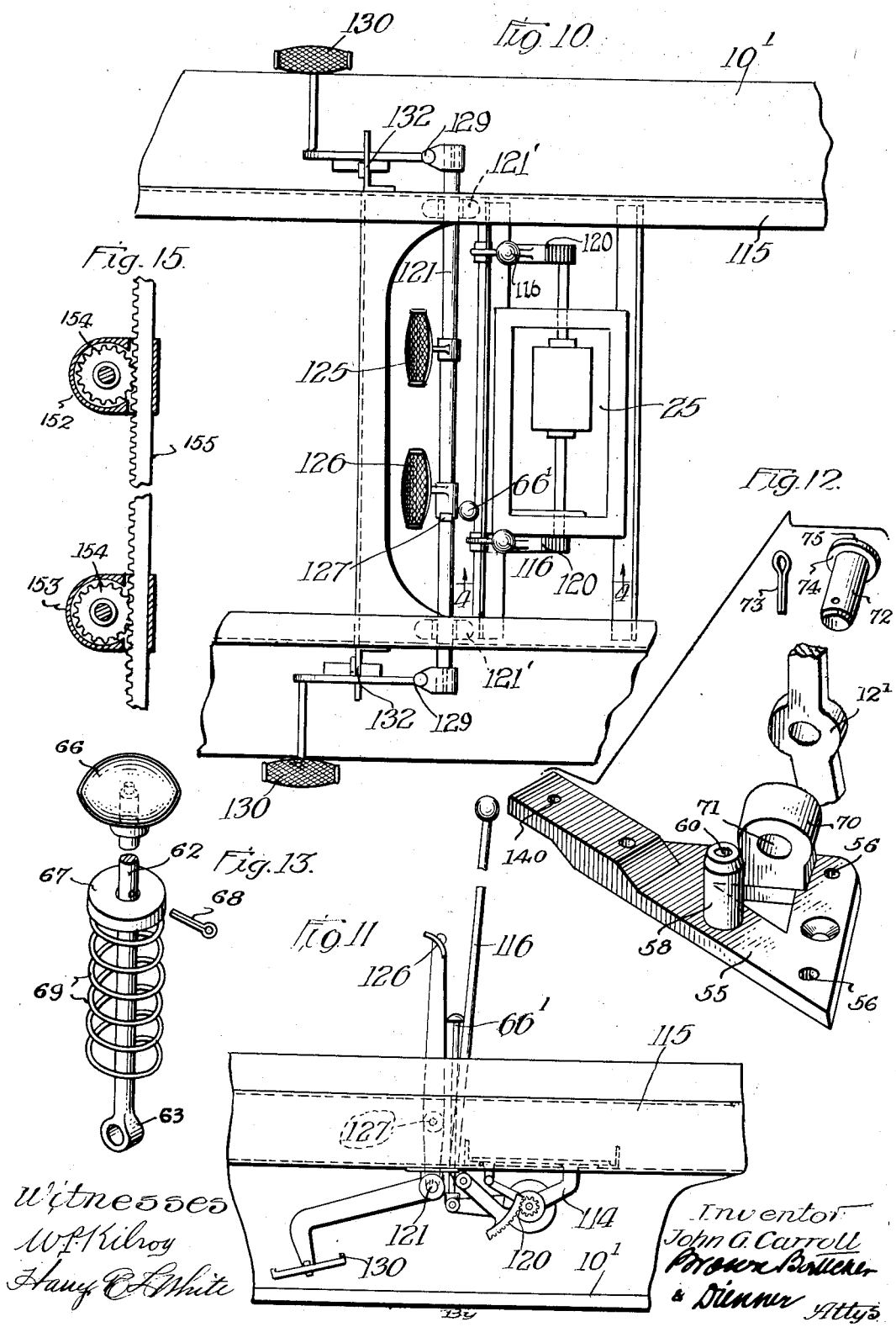

Patented Nov. 13, 1928.

1,691,046

UNITED STATES PATENT OFFICE.

JOHN G. CARROLL, OF CHICAGO, ILLINOIS, ASSIGNOR TO WALKER VEHICLE CO., OF CHICAGO, ILLINOIS, A CORPORATION OF ILLINOIS.

VEHICLE CONTROL.

Application filed April 19, 1924. Serial No. 707,555.

This invention relates to vehicle control.

While the particular mechanism which I shall describe in connection with the drawings is adapted for use in electric vehicles, it is to be understood that the invention is not limited to use with a particular type or class of vehicles but may be employed wherever found adaptable.

In many classes of vehicle delivery numerous stops are necessary at short intervals. In the case of the milk dealer, for example, deliveries are frequently made to almost every building on the route. This requires frequent starting and stopping of the vehicle to drive it from one building to the next or a distance of a few buildings, the driver working ahead from the vehicle or from behind up to where the vehicle is positioned. While in certain cases it has probably been possible to reach the steering wheel from at least one running board, it has been necessary for the driver to enter the vehicle and position himself in driving position in the seat after each stop to start the vehicle and drive it to the next stop, although only a few hundred feet, and stop it there. Where the stops are numerous and at frequent intervals it is apparent that a great amount of the driver's time and energy is spent in getting in and out of the vehicle.

A horse, at least after some training, will start up, draw the vehicle to the next stop and stop there without requiring the driver to enter the vehicle each time, but this has not been so with motor vehicles. Where the seat is arranged over at one side only it has in addition been necessary for the driver to walk around the vehicle to that side to get in.

The primary object of my present invention is to better adapt motor vehicles for such deliveries as this and to provide for driving such vehicles from stop to stop without requiring the driver to enter the vehicle and take the driver's position in the seat at each stop.

Another object is the provision of a novel, simple and improved mechanism for accomplishing the foregoing in a simple and convenient manner and the provision of means that may be embodied in existing vehicle structures in a simple manner and at comparatively low cost.

According to my invention, I provide means for starting, steering, changing the speed, stopping and otherwise controlling the vehicle from outside and without getting in and taking the driver's position in the seat. In the preferred embodiment of the invention this includes means adjacent each running board for effecting the entire control of the vehicle therefrom. After a stop all that is necessary is for the driver to mount the most convenient running board or even from the ground alongside the vehicle start the vehicle, drive it to the next stop. and stop it there. Regardless of the side of the vehicle from which he is working it is unnecessary for him to walk around to the other side and it is unnecessary for him to enter the vehicle and position himself in the seat. The usual or any suitable provision is preferably made in conjunction with this for controlling the vehicle from the driver's position in the seat and provision for controlling the vehicle from one side only or from other points remote from the driver's seat and without entering the vehicle and taking the driver's position in the seat, are contemplated.

To acquaint those skilled in the art with the manner of constructing and practicing the invention, I shall now describe, in connection with the accompanying drawings several specific embodiments of the invention.

In the drawings:

Figure 1 is a side elevational view of an electric truck chassis embodying the improvement of my invention;

Fig. 2 is a top plan view of the same;

Fig. 3 is a detail section on line 3—3 of Fig. 2 showing the operating connection between the two brake shafts;

Fig. 4 is an enlarged fragmentary section on line 4—4 of Fig. 2 partially broken away and showing the operating connection between the controller lever and the controller shaft;

Fig. 5 is a fragmentary section on line 5—5 of Fig. 2 showing in detail the lower end of the brake lever;

Fig. 6 is a fragmentary side elevational view of the brake lever as viewed from the right in Fig. 5;

Fig. 7 is a front elevational view of the controller with the housing or casing thereof removed;

Figs. 8 and 9 are detail transverse sections through the controller on lines 8—8 and 9—9 respectively of Fig. 7;

Fig. 10 is a fragmentary plan view of a modification;

Fig. 11 is a side elevational view of the same.

Fig. 12 is an exploded perspective view of the common mounting for the controller lever and reverse rod;

Fig. 13 is an exploded perspective view of the reverse rod assembly;

Fig. 14 is a fragmentary top plan view of the vehicle showing more or less diagrammatically steering means at each side; and Fig. 15 is a detail section through the steering connections at the lower end of said steering means.

Referring to the drawings the chassis shown is of the standard "Walker" electric type mounted on front wheels 5 and rear wheels 6 and includes side frame members 7. At the forward part of the chassis and spaced transversely so that one will be positioned for access and operation from each running board 10—10 or from the ground along either side the vehicle are a pair of hand levers 11 and 12 adapted for operating the controller to connect the windings of the electric motor in various combinations to change the speed of the vehicle as well understood in the art. The motor is shown in dotted lines at M with the differential D in the rear drive axle A as customary in the "Walker" electric vehicle. Running boards 10—10 may be suspended from side frame members 7—7 by brackets as shown in the usual or any desired manner and their construction, arrangement and extension along the sides of the vehicle may be varied to suit the purpose of the particular vehicle.

Controller levers 11 and 12 of the embodiment shown in Figures 1, 2 and 4 each has an integral hub 13 mounted upon a common shaft 14 which extends transversely across the vehicle frame and is journaled in this embodiment of the invention at its opposite ends in the end plates 27 (Fig. 4) of the controller casing. Additional supporting brackets for the shaft 14 may be provided or it may be supported in any other suitable or preferred manner. It need not extend entirely across the main frame of the vehicle but just sufficiently beyond end plates 27 to carry levers 11 and 12. Levers 11 and 12 may be loose for independent rotation on the shaft 14 as shown in Figs. 1, 2 and 4 or they may be fixed upon the shaft so that the shaft will be rotated by operation of either lever Each lever 11 and 12 has an integral sector 15 extending obliquely downwardly and provided with teeth 16 for meshing engagement with the teeth of pinions 19 on the controller drum shaft 20.

The controller extends transversely across the vehicle frame and is suspended as by brackets 25' from transverse frame members 26 which extend transversely between and are supported at their opposite ends by frame members 7—7. It includes generally a controller drum 25, drum shaft 20, end plates 27 and a suitable enclosing casing (not shown).

The controller shown is of the standard "Walker" electric vehicle type well known in the art and in that the present invention is not concerned with the details of said controller it is not believed that a detailed description of the same is necessary here especially in that said details may and will vary with different installations and the present invention is not confined to use with a particular controller nor is it limited to use with an electric vehicle, although particularly adapted thereto.

Suffice it to say that the controller has suitable terminals 28 (Fig. 9) for connecting the circuit conductors or wires to the main or forward contacts 29 (Fig. 7) on the main drum castings 30 and to the reverse contacts 31 on the reverse drum castings 32 and that by turning shaft 20 by means of either of the controller levers 11 or 12 the motor windings and storage battery may be coupled in various combination to change the speed of the vehicle, as well understood in the art.

The controller drum 25, itself, is rotated by a reverse rod 62, to change the relative positioning of the contacts and thereby the direction of flow of current, to reverse the movement of the vehicle, the reverse speeds being changed in the same manner as the forward speeds by levers 11 and 12 upon setting the drum in reverse by means of rod 62. An arm 36 pivoted at 37 has a roller 38 which is drawn by a spring 39 into engagement with notches 40 in a ratchet member 42 on the controller shaft for holding the controller in the various positions of adjustment. A pawl 44 pivoted at 45 has a free end 44' normally positioned upon the outer periphery of a stop lug 46 as shown in Fig. 9, and a lateral projection from said end rides in a cam slot 48 in a rotatable disc 49. The free end of pawl 44 cooperates with the radial faces 46' of stop lug 46 and prevents accidental movement of the reverse contacts out of position in the forward speeds of the vehicle and of the forward contacts in the reverse speeds of the vehicle.

The controller handles may be mounted upon a common transverse shaft 14, as already explained, or they may be mounted individually upon separate pins or otherwise as desired, and the shaft or pins may be supported by the end plates of the controller casing or by suitable brackets from the vehicle frame or from the transverse controller frame or otherwise, as desired.

In Figures 12 and 13 I have shown a common mounting base for the controller handle and reverse rod. It comprises a generally triangular base plate 55 which is adapted to be bolted, riveted, or otherwise secured to the cross frame members or other part of the vehicle frame. On one leg of the triangular base 55 is an upstanding tubular projection 58 bored at 60 to receive slidably therein the controller reverse rod 62, said rod having at its lower end below base 55 an eye 63 pivoted at 64 to an arm 65 (Figs. 1 and 4). Rotation of arm 65 by depression of rod 62 sets the circuits to reverse the movement of the vehicle. Threaded upon the upper end of rod 62 is foot button 66 positioned (Fig. 2) for convenient access from the driver's seat although it may be otherwise arranged or additional reverse controls may be positioned as are the other controls for operation from position out of the driver's seat. Interposed between a collar 67 which is held against upward movement on rod 62 by a collar pin 68 and base 55 or the floor board of the vehicle is a coiled spring 69 which normally biases rod 62 upwardly and moves the rod upwardly when released and the reverse contacts out of operative relation. Instead of this spring arrangement a tension spring 69' (Fig. 1) may be connected between arm 65 and the base or chassis, if desired.

On another leg of base 55 is an upstanding boss 70 bored at 71 to receive a controller handle pivot pin 72. Pin 72 is secured in bore 71 as by means of a pin 73 which is inserted through one end of the pin. The other end of the pin carries controller lever 12' and is headed at 74 to hold said lever against displacement. Head 74 is chamfered at 75.

The driver's seat 80 (shown in dotted lines in Fig. 1) is disposed transversely across the vehicle just behind the steering wheel 81 in the usual or any suitable or preferred manner. Adjacent to and accessible from the driver's position in seat 80 is a service brake foot pedal 82 and also an emergency brake pedal 85. Service pedal 82 and pedal 85 are mounted upon a common transverse shaft 86, pedal arm 82 being preferably keyed upon shaft 86 and pedal 85 being loose on the shaft for operation independently of shaft 86 and pedal 82. Shaft 86 extends transversely across the vehicle parallel to and forwardly of the axis of pivotal action of controller levers 11 and 12 and is journaled at its opposite ends in bearings 90 suspended from side frame members 7.

Extending transversely across the vehicle parallel to and forwardly of shaft 86 is a second shaft 92 journaled at its opposite ends in bearings 93 mounted, for example, upon side members 7. Shaft 92 constitutes the member through which the service brakes are operated from position remote from the driver's position in seat 80 specifically from either running board 10 or from the ground alongside the vehicle without getting in or taking the driver's position in seat 80. Shaft 92 is connected with shaft 86 through sectors 94 and 95 (Figs. 2 and 3) to turn shaft 86 in the direction for applying the service brakes upon rotation of shaft 92 in the opposite direction. Sectors 94 and 95 are keyed or splined at 96 and 97 upon shafts 92 and 96 respectively and said sectors have peripherally meshing or engaging teeth as shown. Connections (not shown) extend from the upright arm 85' of pedal 85 (Fig. 1) to the emergency brakes of the vehicle and from shaft 86 or pedal 82 to the service brakes so that said brakes will be applied in the usual or any preferred manner upon rotation of shaft 86 or operation of pedal 85.

Mounted upon each of the opposite ends of shaft 92 is a brake control arm or lever 100, one of which extends up adjacent each side of the vehicle for access from position remote from seat 80. The hubs 101 of lever 100 have axially projecting lugs 102 (Figures 5 and 6) which cooperate with complementary lugs 103 projecting from collars 104 fixed on shaft 92 at 105, so that swinging of either lever 100 will rotate shaft 92. Spring pressed pawls 106 pivoted on levers 100 at 107 cooperate with racks 108 attached to the sides of side frame member 7, to hold brake levers 100 in the position in which they are set rods 110 extending up along the levers and terminating in buttons 112, depression of which disengages pawl 106 from rack 108 and permits swinging the brake levers to release or disengage the brakes.

From the foregoing it will now be apparent that the vehicle may be started, stopped and controlled from the driver's position in seat 80 or from position remote from said driver's position in the seat and without taking said position, specifically in the embodiment described from either running board of the vehicle. It is unnecessary for the driver to enter the vehicle and position himself in driving position in seat 80 at each stop. After a stop all that is necessary is for the driver to mount the running board or even from the ground alongside of the vehicle, grasp one of the levers 11 or 12 and swing it to throw the controller "on" from position on the running board or at the side of the vehicle. The motor immediately accelerates and the controller may be advanced from speed to speed by means of said lever. The service brakes may be normally released and levers 100 returned to the positions from which they are thrown in applying the brakes by the usual spring or other suitable means (not shown) or their release may require operation of one of the levers by the driver. The switch is not usually opened and closed at each stop and I have therefore not shown switch controlling means at each side of the vehicle but such provision is contemplated should it become desirable.

Upon reaching the next stop the driver from his position on the running board, throws the controller to "off" position by means of the lever 11 or 12 adjacent the running board that he is on and applies the brakes from the same position by means of the adjacent lever 100 to bring the vehicle to a stop. The delivery is made and the driver again starts the vehicle and drives it to the next stop without getting in. A great deal of time and effort is thus saved in making numerous stops at short intervals. Where a run of considerable length is to be made the driver may get in the seat and drive the vehicle in the usual manner.

The gear and sector connection 94—95 between levers 11 and 12 and the controller may be proportioned to reduce the angle of movement of the handle with respect to the angle of movement of the controlled contacts. Reversing is accomplished by means of the same controls upon first depressing reverse rod 62. In that reversing is an unusual rather than a usual condition only one reverse rod is shown but additional rods or the arrangement of the one rod for operation from the side of the vehicle is contemplated should that become desirable.

In the modification shown in Figures 10 and 11 the controller is again suspended by brackets 14 from side frame members 115 of the vehicle chassis in position transversely there across. As before, the controller is operated by either of the two levers 116 one arranged adjacent each side of the vehicle and each connected through a sector and pinion connection 120 with the controller shaft. In this case only one brake operating shaft 121 is required. A service brake pedal 125 is as before fixed on the shaft 121 for operation from the driver's seat, and emergency brake pedal 126 is loosely sleeved upon shaft 121 and provided with an upwardly projecting arm 127 to which the brake connections to the wheels are attached.

Shaft 121 is journaled just short of its opposite ends in brackets 121' on side members 115 and fixed on each projecting end of the shaft is a pedal arm 129. Each arm 129 extends longitudinally along the outer side of frame members 115 from its rigid mounting or shaft 121 and its forward end is turned down and provided with a laterally extending position on the outer end of each of which is a foot pedal 130 disposed for operation with the foot laterally of the vehicle. This permits the driver while standing on the running board with his feet disposed laterally with respect to the vehicle to depress the foot pedal 130 and apply the brakes, the usual spring or other suitable means normally releasing and returning pedals 130 to the position from which they are depressed. The formation of the pedal arm permits convenient operation from the running board and at the same time provides for proper mounting on shaft 121. Guides 132 (Fig. 10) attached to the side frame members 115 and projecting laterally therefrom cooperate with the longitudinally extending portions of the pedal arms 129 and guide said arms in their operating and releasing movement. In this case the operation is substantially the same as in the first embodiment with the exception that the service brakes are controlled from either side of the vehicle by foot pedals instead of by hand levers.

While the steering wheel 81 can usually be reached and operated from either running board, the provision of separate steering means at each side of the vehicle in conjunction with the other controlling means of my invention is contemplated. As illustrative of such a provision I have shown in Figs. 14 and 15 two steering wheels 150 and 151, one adjacent each side of the vehicle for manipulation from the adjacent running board 10'. Each wheel 150 and 151 has a column 152 and 153 respectively and each has at its lower end a pinion 154 meshing with a common rack 155 through which the wheels are steered. Starting, stopping, speed changes and steering from either side of the vehicle is thus permissible without even reaching over to a common steering wheel. Other steering provision than the two wheels and posts may be provided at each side of the vehicle.

While the invention is particularly applicable to and I have described it in connection with an electric vehicle, it is to be understood, as already pointed out, that it is not limited to a particular type or class of vehicles. Furthermore I have shown means at both sides of the vehicle for controlling the same. The controlling means of either side may be omitted to permit controlling from the driver's position in seat 80 or from one side only, or said controls may be otherwise combined and positioned to control the vehicle from other points remote from the driver's seat without entering the vehicle and taking the driver's position in the seat. Controller handles 11—12 are in "off" position when end 44' of pawl 44 and stop lug 46 are positioned as shown in Figure 9.

I claim:

1. In a motor vehicle, the combination of a running board at one side of the vehicle, a driver's seat, a driving motor, a controller therefor, said controller including a controller drum and a drum shaft, a controller lever mounted adjacent the running board and operable therefrom, meshing gear means connecting the controller lever and the drum shaft to turn said shaft by means of the lever, a transverse brake shaft, a service brake pedal on said shaft adjacent the driver's seat, and a service brake operating member mounted on said shaft adjacent the running board and operable therefrom.

2. In a motor vehicle, the combination of a chassis having a running board at each side, a driver's seat, a driving motor, a controller therefor, said controller including a controller drum and a drum shaft, a controller lever mounted adjacent each running board and operable therefrom, gear means connecting said lever and the drum shaft to turn said shaft by means of said lever, a transverse brake shaft, a service brake pedal on said shaft adjacent the driver's seat, a service brake operating member on said shaft adjacent the running board and operable therefrom, an emergency brake pedal on said shaft, reversing means adjacent the seat, and a steering device adjacent each running board.

3. In a motor vehicle, the combination of a vehicle frame having a running board at one side, a controller lever mounted adjacent the running board for operation therefrom, a brake shaft projecting from the frame over said running board, a pedal arm on the projecting end of said shaft, said arm extending laterally from the shaft and in the direction of the longitudinal dimension of the frame and terminating in an outturned end having a pedal operable from the running board.

4. In a motor vehicle, the combination of a vehicle frame having longitudinal side members and a running board on each side of said frame, a driving motor, a controller therefor, said controller including a drum and a drum shaft, a shaft carried by the frame parallel with the drum shaft, a controller lever on each end of said last shaft, one for operation from each running board, gear means connecting said levers with the drum shaft to turn said shaft upon operation of the levers, a brake shaft carried by the vehicle frame and extending transversely thereacross, and means at each of the opposite ends of said shaft for operation from either running board to operate said brake means.

5. In a motor vehicle, the combination of a vehicle frame having longitudinal side members and a running board on each side of said frame, a driving motor, a controller therefor, said controller including a drum and a drum shaft, a shaft carried by the frame parallel with the drum shaft, a controller lever on each end of said last shaft, one for operation from each running board, gear means connecting said levers with the drum shaft to turn said shaft upon operation of the levers, a brake shaft carried by the vehicle frame and extending transversely thereacross, pedal arms on opposite ends of the brake shaft, said arms extending laterally from the shaft along the sides of the vehicle and having out-turned ends with pedals thereon for operation from the running boards.

6. In a motor vehicle, the combination of a vehicle frame having longitudinal side members and a running board on each side of said frame, a driving motor, a controller therefor, said controller including a drum and a drum shaft, a shaft carried by the frame parallel with the drum shaft, a controller lever on each end of said last shaft, one for operation from each running board, gear means connecting said levers with the drum shaft to turn said shaft upon operation of the levers, a brake shaft carried by the vehicle frame and extending transversely thereacross, a second brake shaft, brake levers on opposite ends of said second shaft, one adjacent each running board, and a gear connection between said first and second brake shafts.

7. In a motor vehicle, the combination of a running board, a brake operating shaft, a pedal arm mounted on said shaft adjacent the running board, said pedal arm having an arm extending longitudinally along the side of the vehicle, and a lateral arm carrying a pedal disposed for operation from the running board with the foot in lateral position with respect thereto.

8. In a motor vehicle, the combination of a running board, a brake operating shaft, a pedal arm mounted on said shaft adjacent the running board, said pedal arm having a relatively long arm extending longitudinally along the side of the vehicle, and a lateral arm carrying a pedal disposed for operation from the running board with the foot in lateral position with respect thereto, a driving motor, a controller for said motor, said controller including a controller shaft and a drum, a driver's seat, and means disposed for operation from the seat or running board for turning the controller shaft to operate the controller.

9. In a motor vehicle, a running board at one side and adjacent the front of the vehicle, a driving motor, a controller therefor, a controller operating lever having operating connection with said controller, a transverse brake shaft, a driver's seat on the chassis adjacent the running board, a brake pedal on said shaft adjacent the driver's seat, a second shaft adjacent the brake shaft, operating connections between the two shafts, a lever on the second shaft, and operating connections between the second shaft and its lever permitting operation of the brake shaft when the brake lever is in neutral position, both of said levers being positioned outside of the body of the vehicle laterally thereof and adjacent the running board to be easily operated therefrom.

10. The combination with a vehicle having a driver's seat and service and emergency brake means of a transverse shaft on the vehicle, a brake control on said shaft and operatively connected with the service brake means and a second brake control on said shaft, said second brake control being operable independently of said first brake control and having operative connections with the emergency brake means.

11. The combination with a vehicle having a running board along the side thereof, a driver's seat and service and emergency brake means, of a transverse shaft on the vehicle, a brake control on said shaft and operatively connected with the service brake means, a second brake control on said shaft, said second brake control being operable independently of said first brake control and having operative connection with the emergency brake means and a control operatively connected with the shaft for operating the service brake means and positioned laterally beyond the body of the vehicle for manipulation from the running board.

12. The combination with a vehicle having a running board along the side thereof and a driver's seat, of a transverse shaft on the vehicle, control means on the shaft and operable from said seat and control means operatively connected with said shaft and positioned adjacent the front of the vehicle and laterally beyond the body of the vehicle for operation from the running board.

13. The combination with a vehicle having running boards on its opposite sides and a driver's seat of a pair of laterally spaced steering wheels, one operable from one side of the seat and from one running board and the other operable from the other side of the seat and the other running board.

In witness whereof, I hereunto subscribe my name this 16th day of April, 1924.

JOHN G. CARROLL.